(12) United States Patent
Hur et al.

(10) Patent No.: US 12,481,469 B2
(45) Date of Patent: Nov. 25, 2025

(54) DISPLAY SYSTEM COMPRISING MODULAR DISPLAY APPARATUS AND SOURCE APPARATUS AND METHOD FOR CONTROLLING THEREOF

(71) Applicant: SAMSUNG ELECTRONICS CO., LTD., Suwon-si (KR)

(72) Inventors: Jung Hur, Suwon-si (KR); Youngkook Kim, Suwon-si (KR); Sanghoon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/513,087

(22) Filed: Nov. 17, 2023

(65) Prior Publication Data

US 2024/0231735 A1    Jul. 11, 2024

Related U.S. Application Data

(63) Continuation of application No. PCT/KR2023/016374, filed on Oct. 20, 2023.

(30) Foreign Application Priority Data

Jan. 6, 2023    (KR) .................. 10-2023-0002458

(51) Int. Cl.
*G06F 3/14* (2006.01)
*G06F 3/04817* (2022.01)
(Continued)

(52) U.S. Cl.
CPC ........ *G06F 3/1438* (2013.01); *G06F 3/04817* (2013.01); *G06F 3/04842* (2013.01); *G06F 3/04847* (2013.01)

(58) Field of Classification Search
CPC ............... G06F 3/1438; G06F 3/04817; G06F 3/04842; G06F 3/04847; G06F 3/1446;
(Continued)

(56) References Cited

U.S. PATENT DOCUMENTS 10,241,666 B2    3/2019    Okumura et al.
10,725,721 B2    7/2020    Akiyama
(Continued)

FOREIGN PATENT DOCUMENTS

JP    2010-20411 A    1/2010
JP    2015-198403 A    11/2015
(Continued)

OTHER PUBLICATIONS

International Search Report (PCT/ISA/210) issued by the International Searching Authority on Feb. 20, 2024 in International Application No. PCT/KR2023/016374.
(Continued)

*Primary Examiner* — Matthew A Eason
*Assistant Examiner* — Chayce R Bibbee
(74) *Attorney, Agent, or Firm* — Sughrue Mion, PLLC

(57) ABSTRACT

According to an aspect of the disclosure, a display system includes: at least one source apparatus; and at least one modular display apparatus comprising a plurality of cabinets and connected to the at least one source apparatus, wherein each of the at least one source apparatus comprises: an output interface; a communication interface connected to the at least one modular display apparatus; and at least one processor configured to: receive, through the communication interface, a notification request signal from the at least one modular display apparatus, and based on the notification request signal, output notification information through the output interface, and wherein the notification request signal
(Continued)

corresponds to a control signal transmitted by a control apparatus to the at least one modular display apparatus.

11 Claims, 15 Drawing Sheets

(51) Int. Cl.
*G06F 3/04842* (2022.01)
*G06F 3/04847* (2022.01)

(58) Field of Classification Search
CPC ............ G09G 5/006; G09G 2300/026; G09G 2370/06; G09G 2356/00; G09G 2370/042; G09G 2370/20; H04N 21/434; H04N 21/4363; H04N 21/442
See application file for complete search history.

(56) References Cited

U.S. PATENT DOCUMENTS

| | | | |
|---|---|---|---|
| 11,276,366 B2 | 3/2022 | Kim et al. | |
| 11,356,741 B2 | 6/2022 | Kim | |
| 2010/0007578 A1 | 1/2010 | Kikuchi et al. | |
| 2016/0034242 A1* | 2/2016 | Cho | G06F 3/1446 |
| | | | 345/1.3 |
| 2016/0098239 A1* | 4/2016 | Lee | H04N 21/485 |
| | | | 348/705 |
| 2016/0342297 A1* | 11/2016 | Ellwood | G09G 5/12 |
| 2018/0027175 A1 | 1/2018 | Cho | |
| 2018/0176632 A1 | 6/2018 | Yang et al. | |
| 2021/0021904 A1* | 1/2021 | Kim | H04N 21/485 |
| 2021/0375231 A1* | 12/2021 | Kim | G06F 3/1446 |
| 2022/0021838 A1 | 1/2022 | Utukuri et al. | |

FOREIGN PATENT DOCUMENTS

| | | |
|---|---|---|
| JP | 2018-113654 A | 7/2018 |
| KR | 10-2015-0008804 A | 1/2015 |
| KR | 10-2016-0016523 A | 2/2016 |
| KR | 10-2017-0089543 A | 8/2017 |
| KR | 10-1783359 B1 | 9/2017 |
| KR | 10-2018-0071873 A | 6/2018 |
| KR | 10-2019-0109964 A | 9/2019 |
| KR | 10-2020-0009830 A | 1/2020 |
| KR | 10-2073373 B1 | 2/2020 |
| KR | 10-2021-0032857 A | 3/2021 |
| KR | 10-2021-0118184 A | 9/2021 |

OTHER PUBLICATIONS

Written Opinion (PCT/ISA/237) issued by the International Searching Authority on Feb. 20, 2024 in International Application No. PCT/KR2023/016374.
Communication issued Oct. 7, 2025, by the European Patent Office in European Patent Application No. 23914917.2.

* cited by examiner

DISPLAY SYSTEM COMPRISING MODULAR DISPLAY APPARATUS AND SOURCE APPARATUS AND METHOD FOR CONTROLLING THEREOF

CROSS-REFERENCE TO RELATED APPLICATIONS

This application is a bypass continuation of International Application No. PCT/KR2023/016374, filed on Oct. 20, 2023, which is based on and claims priority to Korean Patent Application No. 10-2023-0002458, filed on Jan. 6, 2023, in the Korean Intellectual Property Office, the disclosures of which are incorporated by reference herein in their entireties.

BACKGROUND

1. Field

The disclosure relates to a display system including a modular display apparatus and a source apparatus and a method for controlling thereof. More specifically, the disclosure relates to a display system including a source apparatus to transmit image data to a modular display apparatus that displays an image based on the image data, and a method for controlling thereof.

2. Description of Related Art

Development of display technology further diversifies a screen of a display apparatus. In the related art, production of a display apparatus of only a limited size is available. But recently, it is possible to produce a display apparatus of a large screen, beyond the limitation of a size of a display. Accordingly, a large screen display has been used more in daily lives. In particular, a modular display apparatus has been increasingly used to provide an enlarged display screen by combining a plurality of display modules. For example, a display apparatus of a large screen may include a digital signage advertisement board that is installed in a place of large floating population such as station of metro, bus station, or the like, and then displays an outdoor advertisement through a display apparatus.

This display apparatus of a large screen receives image data from a separate source apparatus. In one embodiment, the display apparatus outputs an image corresponding to image data through a plurality of display modules constituting a large screen based on image data received from a source apparatus.

SUMMARY

Provided is a display system including a plurality of source apparatuses and a plurality of modular display apparatuses.

According to an aspect of the disclosure, a display system includes: at least one source apparatus: and at least one modular display apparatus comprising a plurality of cabinets and connected to the at least one source apparatus, wherein each of the at least one source apparatus comprises: an output interface: a communication interface connected to the at least one modular display apparatus: and at least one processor configured to: receive, through the communication interface, a notification request signal from the at least one modular display apparatus, and based on the notification request signal, output notification information through the output interface, and wherein the notification request signal corresponds to a control signal transmitted by a control apparatus to the at least one modular display apparatus.

The control signal may be based on a user command to identify a source apparatus connected to the at least one modular display apparatus.

The control apparatus may be a remote controller configured to control the at least one modular display apparatus, and wherein the control signal may be an infrared (IR) signal generated by the remote controller.

The output interface may include a light emitting diode (LED) element, and wherein the at least one processor may be further configured to output the notification information by making the LED element emit light.

The output interface may include a speaker, and wherein the at least one processor may be configured to output the notification information by outputting sound through the speaker.

According to an aspect of the disclosure, a display system includes: at least one source apparatus: and at least one modular display apparatus comprising a plurality of cabinets on which a plurality of images provided by the at least one source apparatus are displayed, wherein each of the at least one source apparatus comprises: an output interface; a communication interface connected to the at least one modular display apparatus: and at least one processor configured to: transmit, through the communication interface, an image to the at least one modular display apparatus, and output, through the output interface, information about a location of an area where the image is displayed.

The output interface may include a plurality of light emitting diode (LED) elements arranged according to an arrangement format of the plurality of cabinets, and wherein the at least one processor is further configured to output the information about the location of the area by making an LED element, corresponding to one cabinet of the plurality of cabinets, among the plurality of LED elements that emit light.

The output interface may include a display panel, and wherein the at least one processor is further configured to: control the display panel to display a plurality of graphic objects arranged according to an arrangement format of the plurality of cabinets, display a graphic object corresponding to one cabinet of the plurality of cabinets, among the plurality of graphic objects, in a first color, and display remaining graphic objects, among the plurality of graphic objects, in a second color, and output the information about the location of the area.

According to an aspect of the disclosure, a method of controlling at least one source apparatus in a display system, the method comprising: receiving a notification request signal, through a communication interface, from at least one modular display apparatus: and based on the received notification request signal, outputting notification information through an output interface, wherein the notification request signal corresponds to a control signal transmitted by a control apparatus to the at least one modular display apparatus.

The control signal may be based on a user command to identify the at least one source apparatus connected to the at least one modular display apparatus.

The control apparatus may be a remote controller configured to control the at least one modular display apparatus, and wherein the control signal may be an infrared (IR) signal generated by the remote controller.

The output interface may include a light emitting diode (LED) element, and wherein the outputting may include outputting the notification information by making the LED element emit light.

The output interface may include a speaker, and wherein the outputting may include outputting the notification information by outputting sound through the speaker.

According to an aspect of the disclosure, a method of controlling at least one source apparatus connected to at least one modular display apparatus in a display system, the method comprising: transmitting, from the at least one source apparatus, an image to the at least one modular display apparatus: and outputting, through an output interface of the at least one source apparatus, information about a location of an area where the transmitted image is displayed.

The output interface may include a plurality of light emitting diode (LED) elements arranged according to an arrangement format of a plurality of cabinets, and wherein the outputting may include outputting the information about the location of the area by making an LED element corresponding to one cabinet of the plurality of cabinets, among the plurality of LED elements, emit light.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
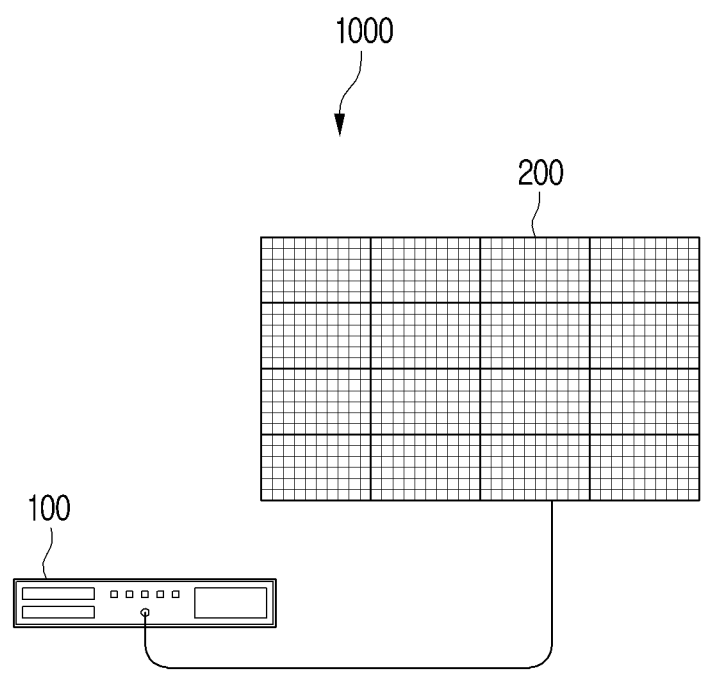
FIG. 1 is a view of an example display system including a modular display apparatus and a source apparatus.

Since the disclosure may be variously modified and have several embodiments, specific non-limiting example embodiments of the disclosure will be illustrated in the drawings and be described in detail in the detailed description. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

In case it is determined that in describing embodiments, detailed description of related known technologies may unnecessarily confuse the gist of the disclosure, the detailed description will be omitted.

The following embodiments may be modified in many different forms, and the scope of the technical spirit of the disclosure is not limited to the following examples. Rather, these embodiments are provided so that this disclosure will be thorough and complete, and will fully convey the technical spirit to those skilled in the art.

The terms used herein are to describe certain embodiments and are not intended to limit the scope of claims. A singular expression includes a plural expression unless otherwise specified.

In this specification, the expressions "have," "may have," "include," or "may include" or the like represent presence of a corresponding feature (for example: components such as numbers, functions, operations, or parts) and does not exclude the presence of additional feature.

In this document, expressions such as "at least one of A [and/or] B," or "one or more of A [and/or] B," include all possible combinations of the listed items. For example, "at least one of A and B," or "at least one of A or B" includes any of (1) only A, (2) only B, or (3) both A and B.

As used herein, the terms "first," "second," or the like may denote various components, regardless of order and/or importance, and may be used to distinguish one component from another, and does not limit the components.

If it is described that a certain element (e.g., first element) is "operatively or communicatively coupled with/to" or is "connected to" another element (e.g., second element), it should be understood that the certain element may be connected to the other element directly or through still another element (e.g., third element).

On the other hand, if it is described that a certain element (e.g., first element) is "directly coupled to" or "directly connected to" another element (e.g., second element), it may be understood that there is no element (e.g., third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware.

Instead, under some circumstances, the expression "a device configured to" may mean that the device "is capable of" performing an operation together with another device or component. For example, the phrase "a processor configured to perform A, B, and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

Various elements and regions in the figures are shown out of scale. Accordingly, the scope of the disclosure is not limited by the relative sizes or spacing drawn from the accompanying drawings.

Hereinafter, with reference to the attached drawings, embodiments will be described in detail so that those skilled in the art to which the disclosure belongs to can easily make and use the embodiments.

Figure 2:
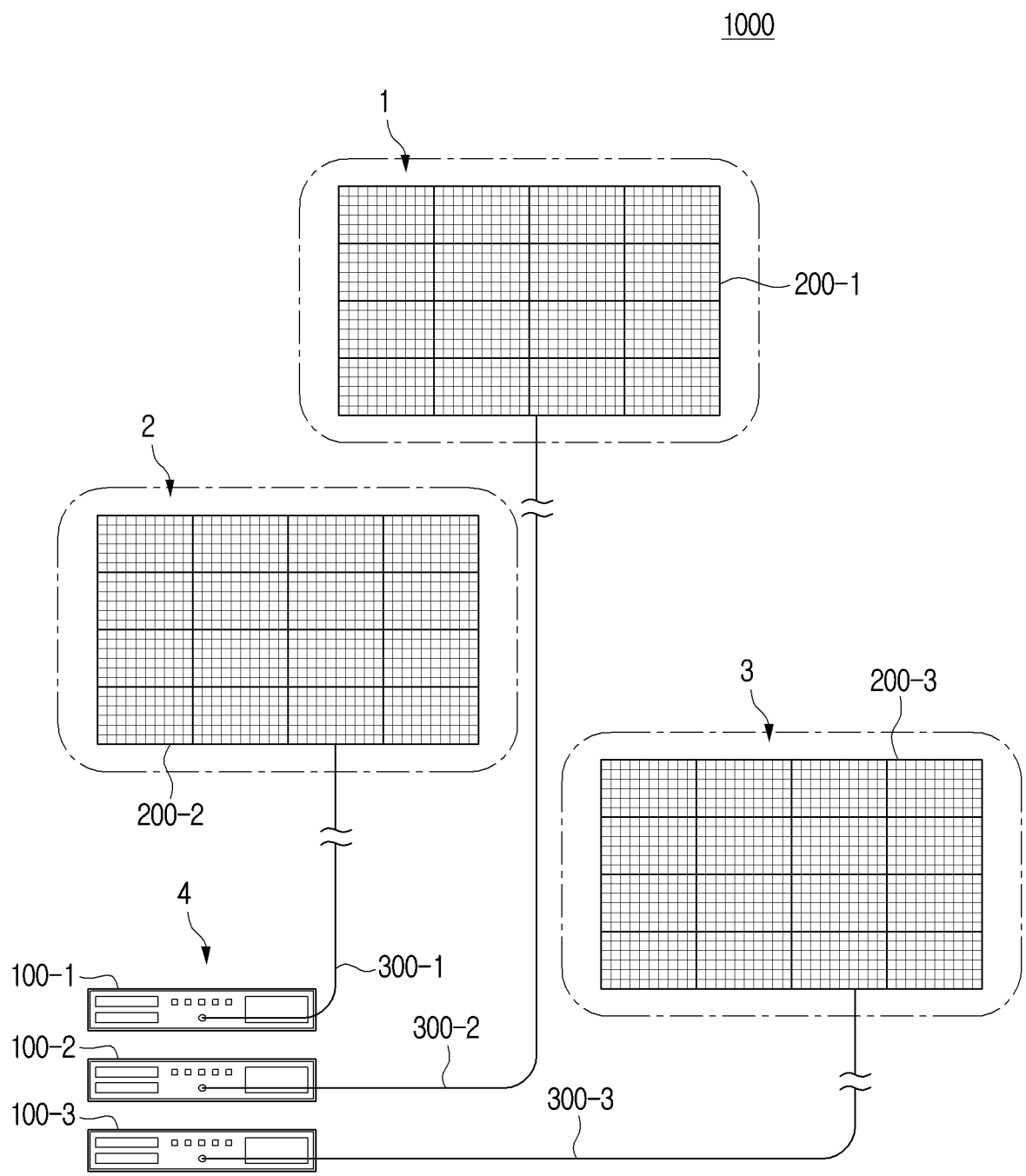
FIG. 2 is a view of an example display system including a plurality of modular display apparatuses and a plurality of source apparatuses respectively connected to the plurality of modular display apparatuses.

FIG. 1 is a view of an example display system including a modular display apparatus and the source apparatus. FIG. 2 is a view of an example display system including a plurality of modular display apparatuses and a plurality of source apparatuses respectively connected to the plurality of modular display apparatuses.

In FIG. 1, a display system 1000 includes a modular display apparatus 200 and a source apparatus 100. Here, the modular display apparatus 200 and the source apparatus 100 may be connected through the communication interface 120, and the source apparatus 100 may transmit image data to the modular display apparatus 200. The modular display apparatus 200 displays an image based on the received image data.

In the case of a display system 1000 including a modular display apparatus 200 and a source apparatus 100, since a modular display apparatus 200 for displaying an image and a source apparatus 100 for transmitting image data related to an image displayed on the modular display apparatus 200 or transmitting a control command are connected to each other to perform respective functions, it is important to accurately identify the source apparatus 100 and the modular display apparatus 200 forming a pair or matching each other.

This is because when a user incorrectly identifies the source apparatus 100 connected to the modular display apparatus 200 and manipulates another source apparatus connected to another modular display apparatus (for example, when a control command for adjusting the luminance or volume of the modular display apparatus 200 is input through the source apparatus 100), the operating state (for example, luminance or volume) of the another modular display apparatus instead of the modular display apparatus 200 intended by the user may be changed.

This problem may frequently occur when the display system 1000 includes a plurality of source apparatuses 100 and a plurality of modular display apparatuses 200, and the plurality of source apparatuses 100 and the plurality of modular display apparatuses 200 are located at different separated spaces.

In FIG. 2, a display system 1000 may include three source apparatuses (a first source apparatus 100-1, a second source apparatus 100-2, and a third source apparatus 100-3) and three modular display apparatuses 200-1, 200-2, 200-3 connected to each of the three source apparatuses (the first source apparatus 100-1, the second source apparatus 100-2, and the third source apparatus 100-3), respectively. At this time, unlike three modular display apparatuses 200-1, 200-2, and 200-3 separately disposed in different spaces 1, 2, 3, the three source apparatuses (the first source apparatus 100-1, the second source apparatus 100-2, and the third source apparatus 100-3) may be disposed in the same space 4. For example, the three source apparatuses (the first source apparatus 100-1, the second source apparatus 100-2, and the third source apparatus 100-3) may be disposed together in a control room, a control station, or the like.

In one embodiment, each modular display apparatus 200-1, 200-2, 200-3 may be arranged in a separate space from the source apparatuses (the first source apparatus 100-1, the second source apparatus 100-2, and the third source apparatus 100-3) connected to the respective modular display apparatuses 200-1, 200-2, 200-3. Accordingly, in order to control (for example, luminance and volume control, etc.) the operation of a specific modular display apparatus among the plurality of modular display apparatuses 200-1, 200-2, 200-3, a process of accurately identifying a specific source apparatus connected to a specific modular display apparatus among the plurality of source apparatuses 100 is required in a space in which the plurality of source apparatuses 100 are arranged.

This is because when the source apparatus connected to the modular display apparatus to be controlled by a user is inaccurately identified as the another source apparatus (that is, the another source apparatus connected to the another modular display apparatus), a malfunction such as changing an image displayed on the another modular display apparatus instead of the modular display apparatus intended by the user or changing luminance or volume of the another modular display apparatus by manipulating the another source apparatus may occur.

For this, in the related art, a label, a sticker, and the like for identifying a modular display apparatus connected to each source apparatus are attached to each source apparatus. However, in a labeling process (i.e., a process of attaching a label, a sticker, etc. to a modular display apparatus), when a wrong label (or sticker) is attached or attached label (or sticker) is damaged or lost, accurately identifying a source apparatus connected to each modular display apparatus may be difficult. If an optical cable 300 connected to a specific modular display apparatus and a specific source apparatus is tracked from a specific modular display apparatus, the specific source apparatus may be accurately identified, but when the distance between a space where the modular display apparatus is disposed and a space where the source apparatus is disposed is very far, a lot of time may be required.

The display system 1000 according to one or more embodiments solves this task. More specifically, without a separate labeling process for a source apparatus, the display system 1000 immediately identifies the source apparatus connected to the modular display apparatus. Hereinafter, the embodiment related thereto will be described.

Figure 3:
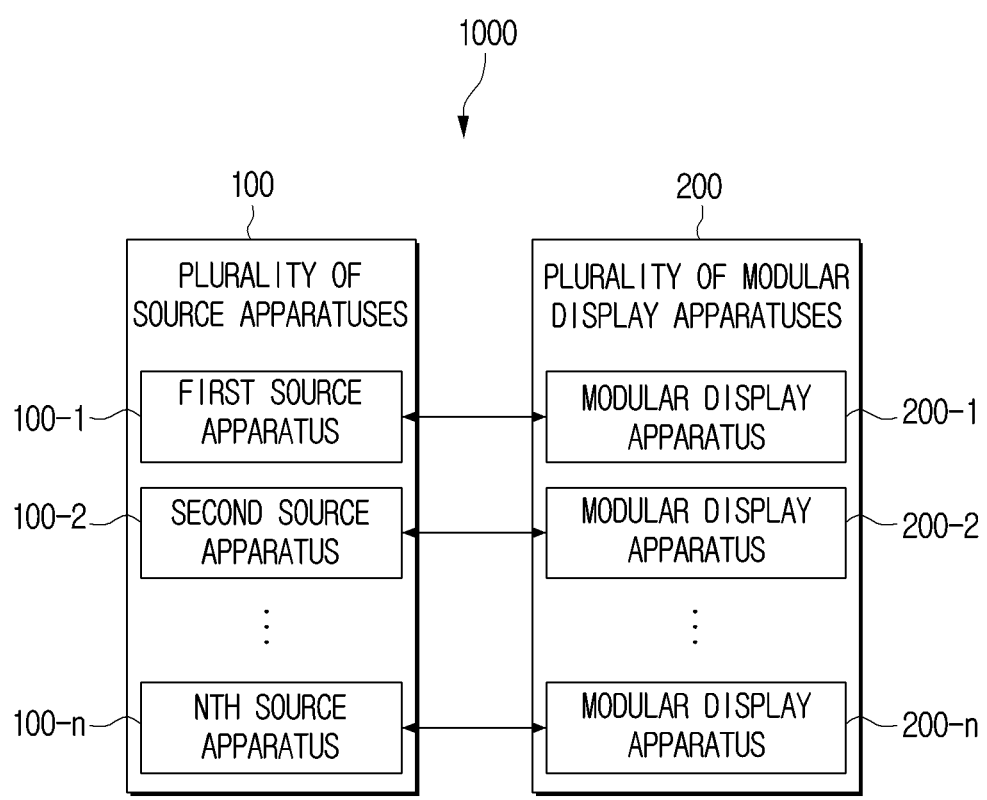
FIG. 3 is a configuration diagram of a display system according to one or more embodiments of the disclosure.
Figure 4:
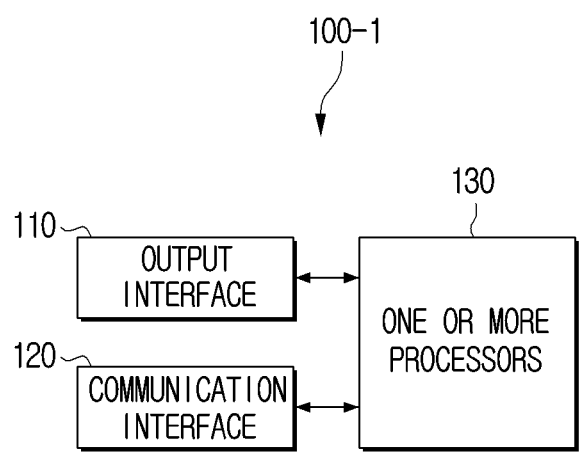
FIG. 4 is a configuration diagram of a source apparatus included in a display system according to one or more embodiments of the disclosure.

FIG. 3 is a configuration diagram of the display system 1000 according to one or more embodiments of the disclosure, FIG. 4 is a configuration diagram of the source apparatus 100 included in the display system 1000 according to one or more embodiments of the disclosure.

The display system 1000 according to one or more embodiments includes a plurality of source apparatuses 100 (e.g., the first source apparatus 100-1, the second source apparatus 100-2, and the third source apparatus 100-3) and a plurality of modular display apparatuses 200 (200-1, 200-2, . . . 200-n).

In one embodiment, the first to nth source apparatus (n is a natural number greater than or equal to 2) is to distinguish different source apparatuses included in the display system 1000 and the first to the nth source apparatus are not apparatuses having different configurations but share the same feature. Therefore, the embodiment of the disclosure related to the source apparatus to be described herein below is applied to the first to nth (n is the natural number) source apparatus in the same manner.

In one embodiment, the plurality of source apparatuses 100 and the plurality of modular display apparatuses 200 included in the display system 1000 may be connected respectively. That is, In FIG. 3, the first source apparatus 100-1 may be connected to the first modular display apparatus 200-1, and the second source apparatus 100-2 may be connected to the second modular display apparatus 200-2. In other words, the plurality of modular display apparatuses 200 may be connected to different source apparatuses 100 respectively. The embodiment is not limited thereto, and a plurality of source apparatuses 100 may be connected to the same modular display apparatus 200. This will be described in detail in FIG. 10.

The source apparatus 100 transmits image data to the modular display apparatus 200. For this, the source apparatus 100 and the modular display apparatus 200 may be connected through the optical cable 300, or the like. In one embodiment, the source apparatus 100 and the modular display apparatus 200 may be connected through the optical cable 300 and may transceiver data (e.g., image data) by an optical communication method.

Each of the source apparatus 100 and the modular display apparatus 200 may convert an electric signal to an optical signal and transmit the signal to another apparatus, or re-convert the received optical signal from the another apparatus to an electric signal. In particular, the source apparatus 100 may convert image data that is an electric signal to an optical signal and transmit the same to the modular display apparatus 200.

The embodiment is not limited thereto and the source apparatus 100 may transmit the image data to the modular display apparatus 200 connected by network based on a wireless communication method.

In an embodiment, the source apparatus 100 may transmit not only image data but also various information to the modular display apparatus 200. For example, the source apparatus 100 may transmit sound data corresponding to the image data to the modular display apparatus 200, or may transmit a control command to control the modular display apparatus 200 to the modular display apparatus 200.

In an embodiment, the source apparatus 100 may transmit a control command to control luminance, volume, or the like, of the modular display apparatus 200 to the modular display apparatus 200 based on a user command input through an input interface (for example, button, touch display panel, etc.) disposed at one side of the source apparatus 100. The source apparatus 100 may be implemented with a set-top box, or the like.

The modular display apparatus 200 receives image data received from the source apparatus 100 and displays an image based on the received image data. In an embodiment, the modular display apparatus 200 may transmit a notification request signal for the source apparatus 100 to the source apparatus 100. Here, the notification request signal may be a signal for requesting to output notification information to the source apparatus 100 connected to the modular display apparatus 200. The notification request signal may be generated by the modular display apparatus 200 by receiving the control signal received from a control apparatus 400 interworking with the modular display apparatus 200.

In an embodiment, the source apparatus receiving the notification request signal from the modular display apparatus 200 may output identification information, or the like, of the source apparatus 100 through the output interface 110 provided in the source apparatus 100. This will be described in detail with reference to FIGS. 4 and 7.

In FIG. 4, the source apparatus 100 according to one or more embodiments of the disclosure includes the output interface 110, the communication interface 120, and one or more processors 130.

The output interface 110 may output various information related to the source apparatus 100. For example, when the source apparatus 100 receives a notification request signal for the source apparatus 100 from the modular display apparatus 200 connected to the source apparatus 100, the output interface 110 may output notification information. For this, the output interface 110 may be implemented with various forms such as at least one LED light emitting element, a speaker, a display panel, or the like.

The communication interface 120 may be connected to the modular display apparatus 200, and may transmit and receive various information to and from the modular display apparatus 200. For example, the communication interface 120 may transmit various information such as image data, sound data, and a control command to the modular display apparatus 200. In addition, the communication interface 120 may receive a notification information request signal from the modular display apparatus 200.

In an embodiment, the communication interface 120 may communicate with the modular display apparatus 200 based on a plurality of communication modules using different communication methods. For example, the communication interface 120 may transmit information necessary for driving a modular display apparatus 200 such as image data, sound data, and a control command by using an optical communication method using the optical cable 300, and may receive the notification request signal by using a wireless communication method.

To be specific, the source apparatus 100 may separately include a communication module for transmitting image data to the modular display apparatus 200 and a communication module for receiving a notification information request signal. For example, the communication interface 120 may include a Small Form-factor Pluggable (SFP) module. At this time, the source apparatus 100 may be connected to one end of the optical cable 300 connected to the modular display apparatus 200 through the SFP module. The source apparatus 100 may convert an electrical signal such as image data, sound data, and a control command into an optical signal through the SFP module included in the communication interface 120, and may then transmit the optical signal to the modular display apparatus 200 through the optical cable 300.

The communication interface 120 may include a wireless communication module. At this time, the source apparatus 100 may receive a notification request signal from the modular display apparatus 200 through the wireless communication module. The wireless communication method may include Wi-Fi, Wi-Fi Direct, ultrawide band (UWB), Zigbee, infrared data association (IrDA), 3GPP, Wi-Max, Long Term Evolution (LTE), 5G, and the like.

The one or more processors 130 control the overall operation of the source apparatus 100. To be specific, one or more processors 130 may be connected to the output interface 110 and the communication interface 120 of the source apparatus 100 and may control overall operation of the source apparatus 100.

The processor 130 according to one or more embodiments may be named as various names such as a digital signal processor (DSP), a microprocessor, a central processing unit (CPU), a micro controller unit (MCU), a micro processing unit (MPU), a neural processing unit (NPU), a controller, an application processor (AP), a timing controller (TCON), but here the term one or more processors 130 will be used.

In an embodiment, one or more processors 130 may be implemented in a system on chip (SoC) type or a large scale integration (LSI) type, or in a field programmable gate array (FPGA) type. In one embodiment, one or more processors 130 may include a volatile memory like SRAM, etc.

Herein below, one or more processors 130 are referred to as the processor 130 for convenience of description.

Figure 5:
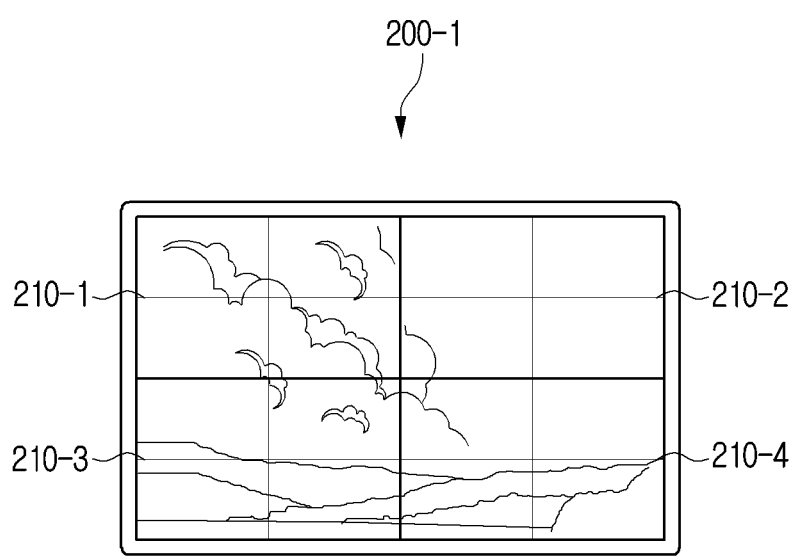
FIG. 5 is a view of a modular display apparatus according to one or more embodiments of the disclosure.
Figure 6:
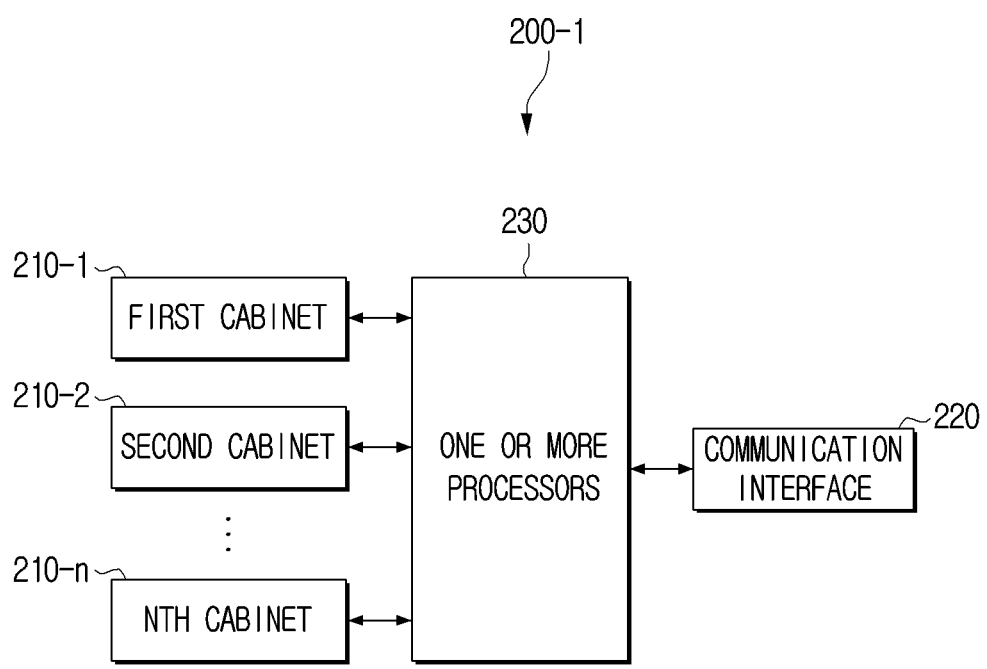
FIG. 6 is a configuration diagram of a modular display apparatus according to one or more embodiments of the disclosure.

FIG. 5 is a view illustrating the first modular display apparatus 200-1 of the plurality of modular display apparatuses 200 (included in the display system 1000) according to an embodiment of the disclosure, and FIG. 6 is a diagram illustrating a configuration of the first modular display apparatus 200-1 among the plurality of modular display apparatuses 200 (included in the display system 1000) according to an embodiment of the disclosure. In FIG. 5 and FIG. 6, the first modular display apparatus 200-1 is just an example. The first modular display apparatus 200-1 may be replaced with other modular display apparatuses, such as the second modular display apparatus 200-2, the third modular display apparatus 200-3, and the fourth modular display apparatus 200-4.

In one embodiment, the first to nth modular display apparatuses (n is a natural number greater than or equal to 2) shown in FIG. 3 is to distinguish different modular display apparatuses included in the display system 1000, and the first to nth source apparatuses are not devices having different configurations but share the same features. Therefore, an embodiment of the disclosure for a modular display apparatus described below is equally applied to the first to nth modular display apparatuses (n is a natural number) shown in FIG. 3.

In FIG. 6, the first modular display apparatus 200-1 according to one or more embodiments includes a plurality of cabinets 210 (210-1, 210-2, . . . 210-*n*, wherein n is the natural number of 2 or more), the communication interface 220, and one or more processors 230.

The first modular display apparatus 200-1 may include a plurality of cabinets 210. In this case, the first modular display apparatus 200-1 may be implemented as one large display apparatus such as a digital signage, an electronic display, or the like, in which a plurality of cabinets including a plurality of display modules are coupled or assembled, or one small display apparatus such as a monitor for a personal computer, a TV, or the like, but is not limited thereto.

A plurality of cabinets are disposed in a format of a matrix and configure the first modular display apparatus 200-1. For example, In FIG. 5, if the modular display apparatus 200 includes four cabinets 210-1, 210-2, 210-3, and 210-4, four cabinets 210-1, 210-2, 210-3, and 210-4 may be disposed in a format of 2×2 and implement the first modular display apparatus 200-1.

At this time, the first modular display apparatus 200-1 outputs an image through a plurality of cabinets 210 constituting the first modular display apparatus 200-1. In one embodiment, when each cabinet 210 is coupled according to a preset arrangement format, the first modular display apparatus 200-1 may output a specific image through an entire screen implemented as display panels of a plurality of display modules included in each cabinet 210 are coupled. Each cabinet 210 outputs a portion of the specific image.

In an embodiment, the first modular display apparatus 200-1 may have different sizes or different resolutions, since various numbers of cabinets 210 are coupled. In one embodiment, in order to implement the first modular display apparatus 200-1, the plurality of cabinets 210 may be arranged in various matrix formats other than the 2×2 matrix format illustrated in FIG. 5. That is, according to one or more embodiments of the disclosure, the plurality of cabinets 210 may be arranged in a matrix format of M×L (where M, L is a natural number equal to or greater than 1). The cabinet may be referred to as a 'sub-screen' and a "display apparatus."

The communication interface 220 may be connected to the source apparatus 100 and may transmit and receive various information to and from the source apparatus 100. For example, the communication interface 220 may receive various information such as image data, sound data, and a control command from the source apparatus 100. In an embodiment, the communication interface 220 may transmit a notification information request signal to the source apparatus 100. In an embodiment, the communication interface 220 may be connected to the control apparatus 400 to receive a control signal.

The communication interface 220 may communicate with the source display apparatus 100 based on a plurality of communication modules using different communication schemes. For example, the communication interface 220 may receive image data, sound data, a control command, and the like from the source apparatus 100 by an optical communication method using the optical cable 300, and the notification request signal may be transmitted by using a wireless communication method.

In an embodiment, the modular display apparatus 200 may separately include a communication module to transmit image data to the source apparatus 100 and a communication module to receive the notification information request signal.

For example, the communication interface 220 may include a Small Form-Factor Pluggable (SFP) module. The modular display apparatus 200 may be connected to the other end of the optical cable 300 connected to the source apparatus 100 through the SFP module. The modular display apparatus 200 may receive, from the source apparatus 100 through the optical cable 300, an optical signal such as image data, sound data, and a control command converted into an optical signal through the SFP module included in the communication interface 220.

The communication interface 220 may include a wireless communication module. At this time, the modular display apparatus 200 may transmit a notification request signal to the source apparatus 100 through the wireless communication module. In an embodiment, the modular display apparatus 200 may receive a control signal to the control apparatus 400 through a wireless communication module. The communication method may include Wi-Fi, Wi-Fi Direct), ultrawide band (UWB), Zigbee, Infrared Data Association (IrDA), 3GPP, Wi-Max, Long Term Evolution (LTE), 5G, IR, Bluetooth, and the like.

One or more processors 230 control overall operation of the modular display apparatus 200. In an embodiment, one or more processors 230 may be connected to the communication interface 220 and the plurality of cabinets 210 of the modular display apparatus 200 and may control overall operation of the modular display apparatus 200.

The processor 230 according to one or more embodiments may be named as various names such as a digital signal processor (DSP), a microprocessor, a central processing unit (CPU), a micro controller unit (MCU), a micro processing unit (MPU), a neural processing unit (NPU), a controller, an application processor (AP), a timing controller (TCON), but here the term one or more processors 130 will be used.

In an embodiment, one or more processors 130 may be implemented in a system on chip (SoC) type or a large scale integration (LSI) type, or in a field programmable gate array (FPGA) type. In an embodiment, one or more processors 130 may include a volatile memory like SRAM, etc.

Herein below, for convenience of description, one or more processors 230 are referred to as the processor 230.

According to one or more embodiments, the processor 130 of the source apparatus 100 may receive a notification request signal corresponding to the control signal through the communication interface 120 based on receiving a control signal from the control apparatus 400 by the modular display apparatus 200. In an embodiment, when receiving a control signal from the control apparatus 400 interworking with the modular display apparatus 200 connected to the source apparatus 100, a notification request signal may be generated.

Here, the control apparatus 400 may be an apparatus set to transmit a control command to the modular display apparatus 200 by communicating with the modular display apparatus 200. For example, the control apparatus 400 may be implemented with a remote controller interworking with the modular display apparatus 200. At this time, the control apparatus 400 may transmit a control command to the modular display apparatus 200 by using an IR communication method. That is, the control apparatus 400 may be a remote controller based on IR communication. For this, the modular display apparatus 200 may each include the IR communication module.

Alternatively, the control apparatus 400 may transmit a control command to the modular display apparatus 200 by using the Bluetooth communication method. That is, the control apparatus 400 may be a remote controller based on the Bluetooth communication method. At this time, the control apparatus 400 may be an apparatus pre-registered in the modular display apparatus 200 through a pairing process. For this, the modular display apparatus 200 may include the Bluetooth communication module, respectively.

In an embodiment, the control apparatus 400 may be connected to the modular display apparatus 200 by using various communication methods and may transmit a control command to the modular display apparatus 200.

The embodiment is not limited thereto and the control apparatus 400 may be implemented with various types of electronic apparatuses capable of transceiving information by communicating with the modular display apparatus 200, such as a smartphone, personal digital assistant (PDA), tablet PC, or the like.

The control apparatus 400 may be connected to the communication interface of the modular display apparatus 200 and may transmit a control command to the modular display apparatus 200. In particular, the control apparatus 400 may transmit, to the modular display apparatus 200, a control signal to request generating a notification request signal with respect to the source apparatus 100. In an embodiment, the control apparatus 400 may transmit various control commands such as adjusting luminance, volume, or the like, of the modular display apparatus 200.

Based on the control signal to request generating the notification request signal from the control apparatus 400, the modular display apparatus 200, after generating a notification request signal, may transmit the generated notification request signal to the source apparatus 100 connected to the modular display apparatus 200 through the communication interface of the modular display apparatus 200.

The processor 130 of the source apparatus 100, which receives a notification request signal through the communication interface 120, outputs notification information through the output interface 110. Accordingly, a user may accurately identify the source apparatus 100 connected to the modular display apparatus 200 having received a control command from the control apparatus 400 in a space in which a plurality of source apparatuses 100 are arranged.

Figure 7:
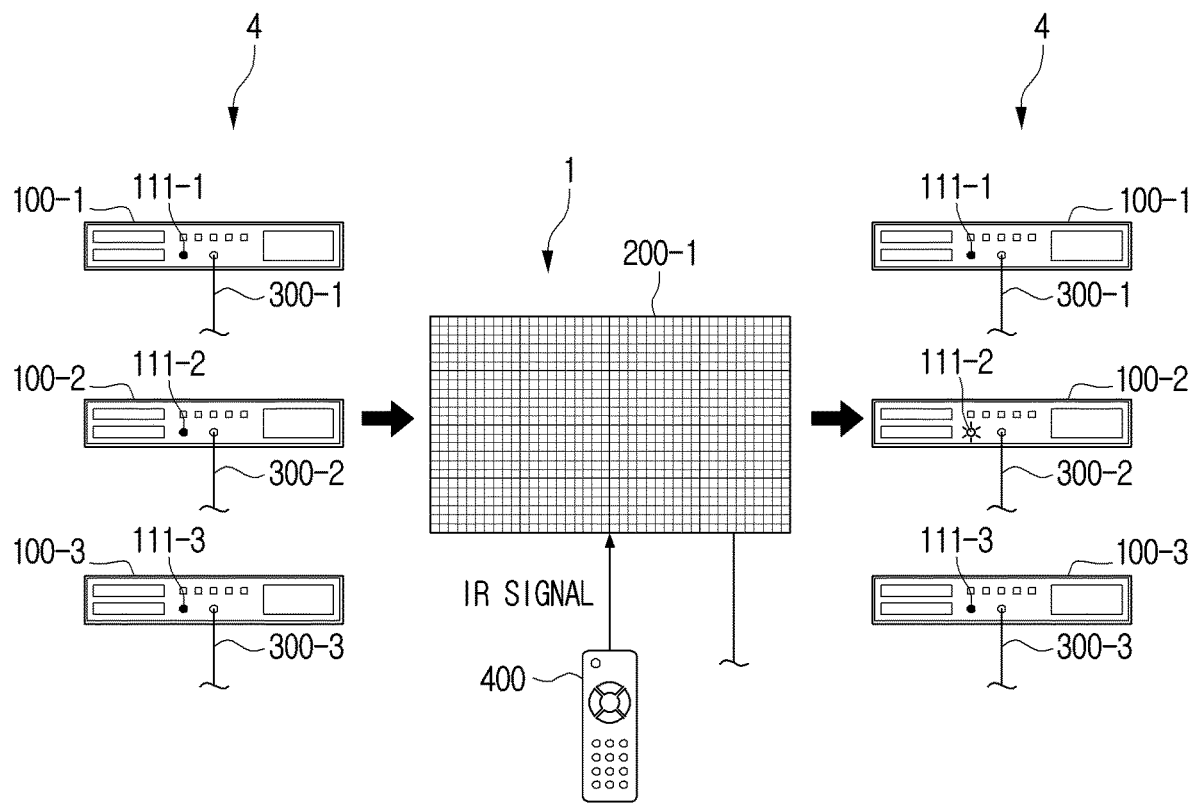
FIG. 7 is a view illustrating that a source apparatus receiving a notification request signal from a modular display apparatus among a plurality of source apparatuses makes an LED module emit light to output notification information according to one or more embodiments of the disclosure.

FIG. 7 is a view illustrating that the source apparatus 100 receiving a notification request signal from the modular display apparatus 200 among a plurality of source apparatuses makes an LED module emit light to output notification information according to one or more embodiments of the disclosure.

In FIG. 7, when the first modular display apparatus 200-1 disposed in a first space 1 among a plurality of modular display apparatuses 200 included in the display system 1000 receives a control command for requesting to generate a notification request signal from the control apparatus 400 (an IR communication-based remote controller), the first modular display apparatus 200-1 may generate a notification request signal to be transmitted to the source apparatus 100 connected to the first modular display apparatus 200-1. In an embodiment, the first modular display apparatus 200-1 may transmit the generated notification request signal to the source apparatus 100 connected to the first modular display apparatus 200-1.

The source apparatus 100 receiving the notification request signal from the first modular display apparatus 200-1 may output notification information through the output interface 110. For example, the output interface 110 may include an LED element. At this time, the processor 130 may output notification information by making the LED element emit light.

In an embodiment, referring back to FIG. 7, respective output interfaces 110-1, 110-2, 110-3 of each of the plurality of source apparatuses (the first source apparatus 100-1, the second source apparatus 100-2, and the third source apparatus 100-3) disposed in the fourth space 4 may include LED elements 111-1, 111-2, and 111-3, respectively. Here, the source apparatus (that is, the second source apparatus 100-2) which is connected to the first modular display apparatus 200-1 among the plurality of source apparatuses (the first source apparatus 100-1, the second source apparatus 100-2, and the third source apparatus 100-3) and receives the notification request signal from the first modular display apparatus 200-1 may emit the notification information by emitting the LED element 111-2.

In an embodiment, the processor 130-2 of the second source apparatus 100-2 transmits a driving current to the LED element 111-2 to control the LED element 111-2 to output light. Accordingly, a user in the fourth space 4 may intuitively identify that the source apparatus connected to the first modular display apparatus 200-1, which is a modular display apparatus 200 to be controlled by the user, is the second source apparatus 100-2.

Accordingly, the user may control so that the control command to adjust luminance, volume, or the like of the first modular display apparatus 200-1 is transmitted to the first modular display apparatus 200-1 through the second source apparatus 100-2 or may make image data be more accurately transmitted to the first modular display apparatus 200-1 by checking connection between the optical cable 300-2 and the second source apparatus 100-2.

According to one or more embodiments of the disclosure, the output interface 110 may include a speaker. At this time, the processor 130 may output sound through a speaker and output notification information. That is, the source apparatus 100, which receives the notification request signal from the modular display apparatus 200 among the plurality of source apparatuses 100, may output a sound indicating that the notification information signal has been received through the speaker. Accordingly, the user may accurately identify the source apparatus 100 connected to the modular display apparatus 200 to be controlled by the user among the plurality of source apparatuses 100.

Figure 8:
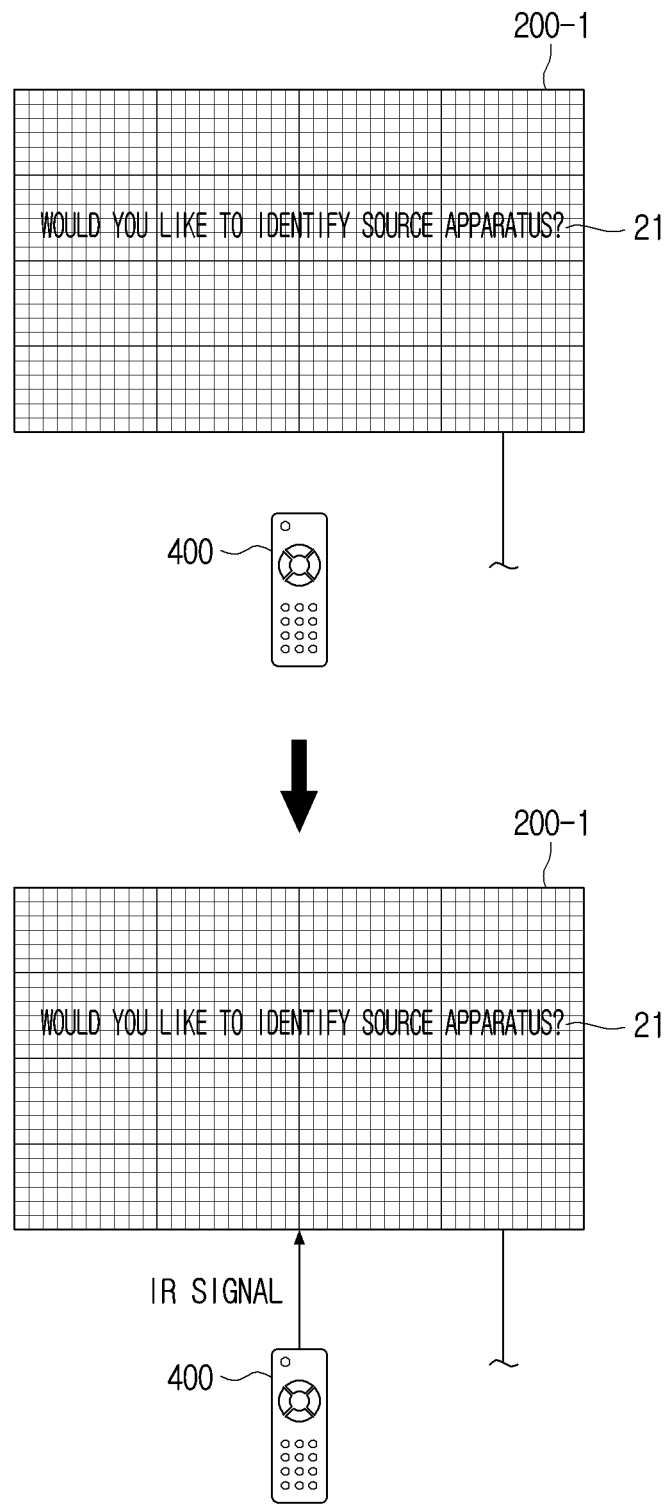
FIG. 8 is a view illustrating a modular display apparatus for receiving a control command from a control apparatus in a source apparatus confirmation mode according to one or more embodiments of the disclosure.

FIG. 8 is a view illustrating the first modular display apparatus 200-1 for receiving a control command from a control apparatus in the source apparatus 100 confirmation mode according to one or more embodiments of the disclosure.

In an embodiment, each of the modular display apparatus 200 may receive a signal to request generating the notification information signal with respect to the source apparatus 100 from the control apparatus 400 through the source apparatus 100 confirmation mode.

In an embodiment, the control apparatus 400 connected to the modular display apparatus 200 may transmit various control commands to the modular display apparatus 200. In this case, when the modular display apparatus 200 receives a control command for switching to a mode for identifying the source apparatus 100 connected to the modular display apparatus 200 (i.e., the source apparatus 100 confirmation mode) from the control apparatus 400, the modular display apparatus 200 may switch the mode of the modular display apparatus 200 from the normal mode to the source apparatus 100 confirmation mode.

Here, the general mode may be a mode for receiving a control command to control luminance, volume, or the like, of the modular display apparatus 200 from the control apparatus 400, and the source apparatus 100 confirmation mode may be a mode for receiving a control command to request generating a notification information signal from the control apparatus 400.

Accordingly, In FIG. 8, when the first modular display apparatus 200-1 receives a control command for switching from the control apparatus 400 to the source apparatus 100 confirmation mode, the first modular display apparatus 200-1 may switch the mode of the first modular display apparatus 200-1 to the source apparatus 100 confirmation mode and output a message requesting to transmit a control command for requesting to generate the notification information signal. Accordingly, the first modular display apparatus 200-1 enables a user to recognize that the mode of the first modular display apparatus 200-1 has been switched to the confirmation mode of the source apparatus 100.

At this time, the control command to request generating a notification information signal according to one or more embodiments of the disclosure may be transmitted as a preset button is pressed among a plurality of buttons disposed in a remote controller.

Figure 9:
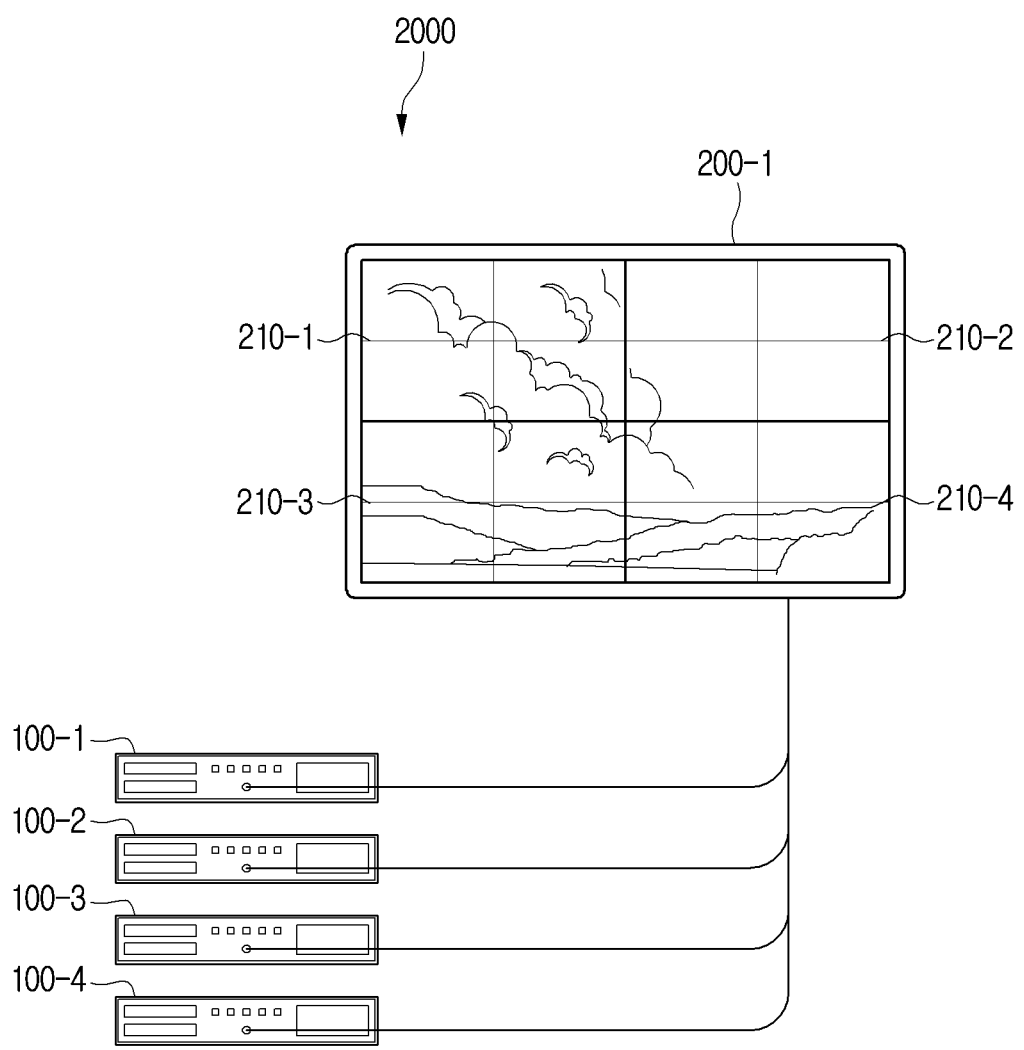
FIG. 9 is a view of a display system according to one or more embodiments of the disclosure.

FIG. 9 is a view of a display system 2000 according to one or more embodiments of the disclosure.

According to one or more embodiments of the disclosure, a plurality of source apparatuses 100 in the display system 2000 may be connected to the first modular display apparatus 200-1. In an embodiment, as illustrated in FIG. 9, four source apparatuses (the first source apparatus 100-1, the second source apparatus 100-2, the third source apparatus 100-3, and the fourth source apparatus 100-4) may be connected to one modular display apparatus 200.

At this time, the first modular display apparatus 200-1 may display an image through a plurality of cabinets 210-1, 210-2, 210-3, and 210-4 based on a plurality of image data provided by a plurality of source apparatuses 100. In an embodiment, the modular display apparatus 200 may receive, from each source apparatus (the first source apparatus 100-1, the second source apparatus 100-2, the third source apparatus 100-3, and the fourth source apparatus 100-4), image data displayed in an area corresponding to each source apparatus (the first source apparatus 100-1, the second source apparatus 100-2, the third source apparatus 100-3, and the fourth source apparatus 100-4).

Here, an area corresponding to each source apparatus (the first source apparatus 100-1, the second source apparatus 100-2, the third source apparatus 100-3, and the fourth source apparatus 100-4) may be an area separated and set not to overlap on the modular display apparatus 200. At this time, an area corresponding to each source apparatus (the first source apparatus 100-1, the second source apparatus 100-2, the third source apparatus 100-3, and the fourth source apparatus 100-4) may include one or more cabinets.

Referring back to FIG. 9, the first modular display apparatus 200-1 may be divided into four areas. In an embodiment, the areas may be divided into a first area including a cabinet (that is, a cabinet 210-1 disposed at an upper left) disposed in a first row and a first column, a second area including a cabinet (that is, a cabinet 210-2 disposed at a upper right) disposed in a first row and a second column, a third area including a cabinet (that is, a cabinet 210-3 disposed at an lower left) disposed in a second row and a first column, and a fourth area including a cabinet (that is, a cabinet 210-4 disposed at an upper right) disposed in a second row and a second column. That is, each area (first to fourth areas) may include one cabinet.

At this time, the first modular display apparatus 200-1 may receive image data about the image displayed on the upper left cabinet 210-1 from the first source apparatus 100-1 among a plurality of source apparatuses 100, receive image data about the image displayed on the upper right cabinet 210-2 from the second source apparatus 100-2 among a plurality of source apparatuses 100, receive image data about the image displayed on the lower left cabinet 210-3 from the third source apparatus 100-3 among a plurality of source apparatuses 100, and receive image data about the image displayed on the lower right cabinet 210-4 from the fourth source apparatus 100-4 among a plurality of source apparatuses 100. Likewise, a plurality of cabinets 20-1, 210-2, 210-3, and 210-4 included in the modular display apparatus 200 may receive image data from different source apparatuses according to an area where a plurality of cabinets 210-1, 210-2, 210-3, and 210-4 are included.

At this time, the processor 130 of the source apparatus 100 may output, through the output interface 110, information about a location of an area where an image generated based on the image data transmitted by the source apparatus 100 among a plurality of cabinets 210-1, 210-2, 210-3, and 210-4 is displayed.

In an embodiment, when a plurality of source apparatuses 100 are connected to first modular display apparatus 200-1, each source apparatus 100 may output, through the output interface 110, information indicating the location of an area in which an image generated based on image data transmitted by each source apparatus 100 is displayed. That is, each source apparatus 100 may display a location of an area set for each source apparatus 100 among a plurality of areas for distinguishing the first modular display apparatus 200-1.

For example, referring back to FIG. 9, the first source apparatus 100-1 may output, through the output interface 110, information indicating a location of an area in which an image generated based on image data transmitted by the first source apparatus 100-1 is displayed, that is, a location of an area at the upper left in the first modular display apparatus 200-1. In one embodiment, the second source apparatus 100-2 may output, through the output interface 110, information indicating a location of an area in which an image generated based on the image data transmitted by the second source apparatus 100-2 is displayed, that is, a location of an upper right area in the first modular display apparatus 200-1. In one embodiment, the third source apparatus 100-3 may output, through the output interface 110, information indicating a location of an area where an image generated based on the image data transmitted by the third source apparatus 100-3 is displayed, that is, a location of a lower left area in the first modular display apparatus 200-1. In an embodiment, the fourth source apparatus 100-4 may output, through the output interface 110, information indicating a location of an area in which an image generated based on the image data transmitted by the fourth source apparatus 100-4 is displayed, that is, a location of a lower right area in the first modular display apparatus 200-1.

For example, the processor 130 of the source apparatus 100 may output location information through the plurality of LED elements 111 included in the output interface 110. At this time, a plurality of LED elements 111 may be arranged according to a format of arrangement of a plurality of cabinets. In an embodiment, the processor 130 may output information about the location of the area by making LED element corresponding to the cabinet among a plurality of LED elements 111 emit light.

In an embodiment, each of a plurality of source apparatuses 100 may include a plurality of LED elements 111 of the number corresponding to the number of the plurality of areas (specifically, a plurality of areas set to correspond to a plurality of source apparatuses 100, respectively) of the first modular display apparatus 200-1 in which a plurality of source apparatuses 100 are connected together, and the plurality of LED elements 111 may be arranged on one side of each source apparatus 100 according to the arrangement of the plurality of source areas.

Figure 10:
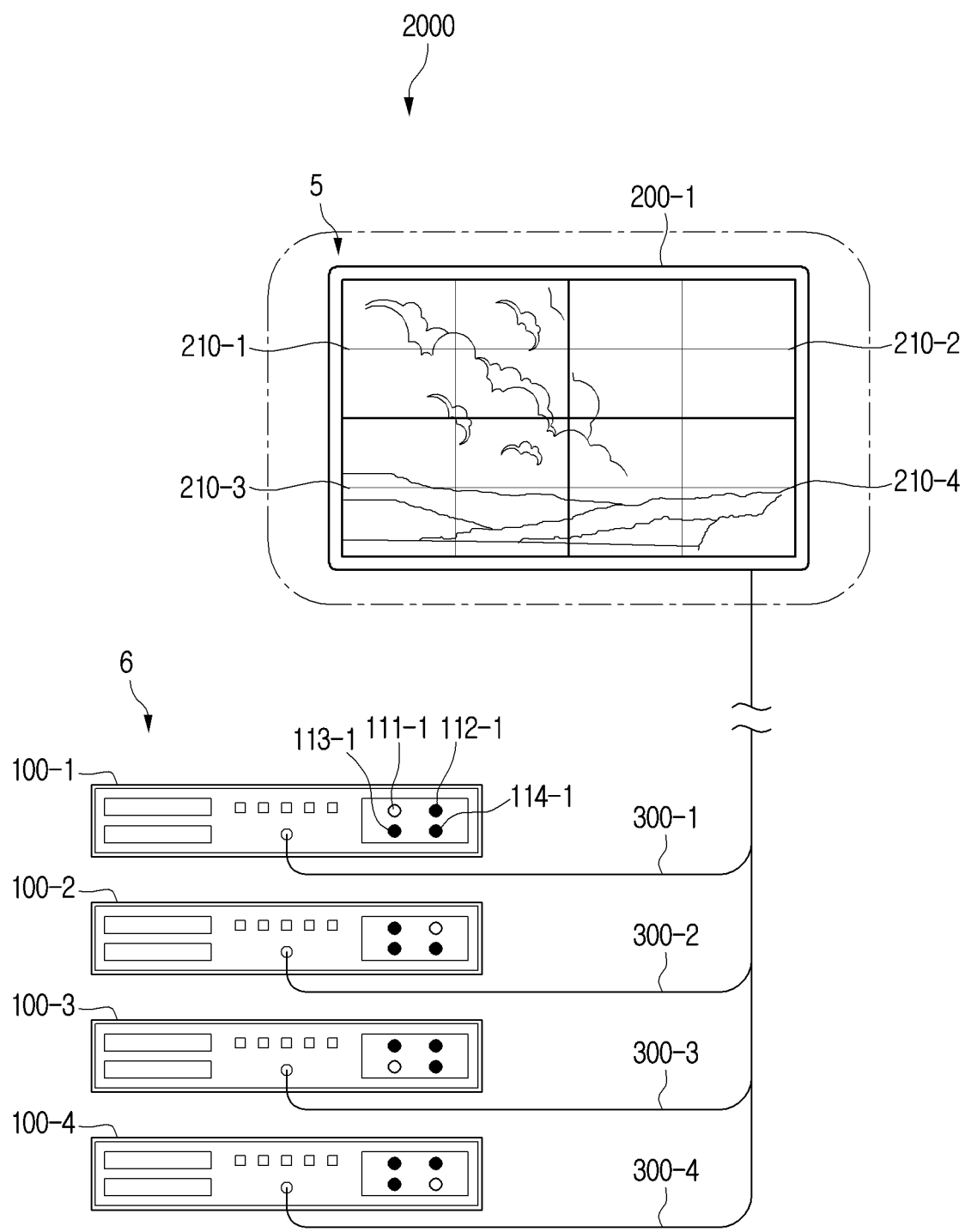
FIG. 10 illustrates a view of outputting location information by making an LED element disposed at a location corresponding to a location of an area corresponding to a source apparatus among a plurality of LED elements emit light according to one or more embodiments of the disclosure.

FIG. 10 illustrates a view of outputting location information by making an LED element disposed at a location corresponding to a location of an area corresponding to the source apparatus 100 among a plurality of LED elements emit light according to one or more embodiments of the disclosure.

For example, In FIG. 10, when four source apparatuses 100 are connected to the first modular display apparatus 200-1 and each source apparatus 100 is set to correspond to four areas (four areas each including one cabinet) in the first modular display apparatus 200-1, four LED elements 111-1, 111-2, 111-3, and 111-4 arranged according to the arrangement format (that is, a 2×2 matrix format) of four areas may be provided on one side of each source apparatus 100 in each of the four source apparatuses 100. That is, four LED elements 111-1, 111-2, 111-3, and 111-4 arranged in the format of 2×2 may be arranged on one side of each source apparatus 100.

At this time, the processor 130 of each source apparatus 100 may transmit a control signal to a driver in the source apparatus 100 so that a driving current is provided to the LED element indicating the location of the area corresponding to each source apparatus 100. Accordingly, each source apparatus 100 may emit light of an LED element arranged at a location corresponding to the location of an area in a modular display in which an image generated based on the image data transmitted by each source apparatus 100 is displayed.

That is, In FIG. 10, the user may intuitively recognize that the first source apparatus 100-1 transmits image data for an image displayed on the upper left area of the first modular display apparatus 200-1 as the LED element 111-1 disposed at the left upper end among the four LED elements 111-1, 111-2, 111-3, 111-4 of the first source apparatus 100-1 emits light. Likewise, the user may intuitively identify where an area corresponding to the second to fourth source apparatuses 100-2 to 100-4 is located in which area among the first modular display apparatus 200-1.

According to one or more embodiments of the disclosure, the output interface 110 of the source apparatus 100 may include a display panel. At this time, the processor 130 may control the display panel to display a plurality of graphic objects arranged according to the arrangement format of the plurality of cabinets 210. In an embodiment, the processor 130 may display, in a first color, a graphic object corresponding to an area corresponding to the source apparatus 100 among the plurality of graphic objects, and display the remaining graphic objects in a second color to output information on the location of the area.

Figure 11:
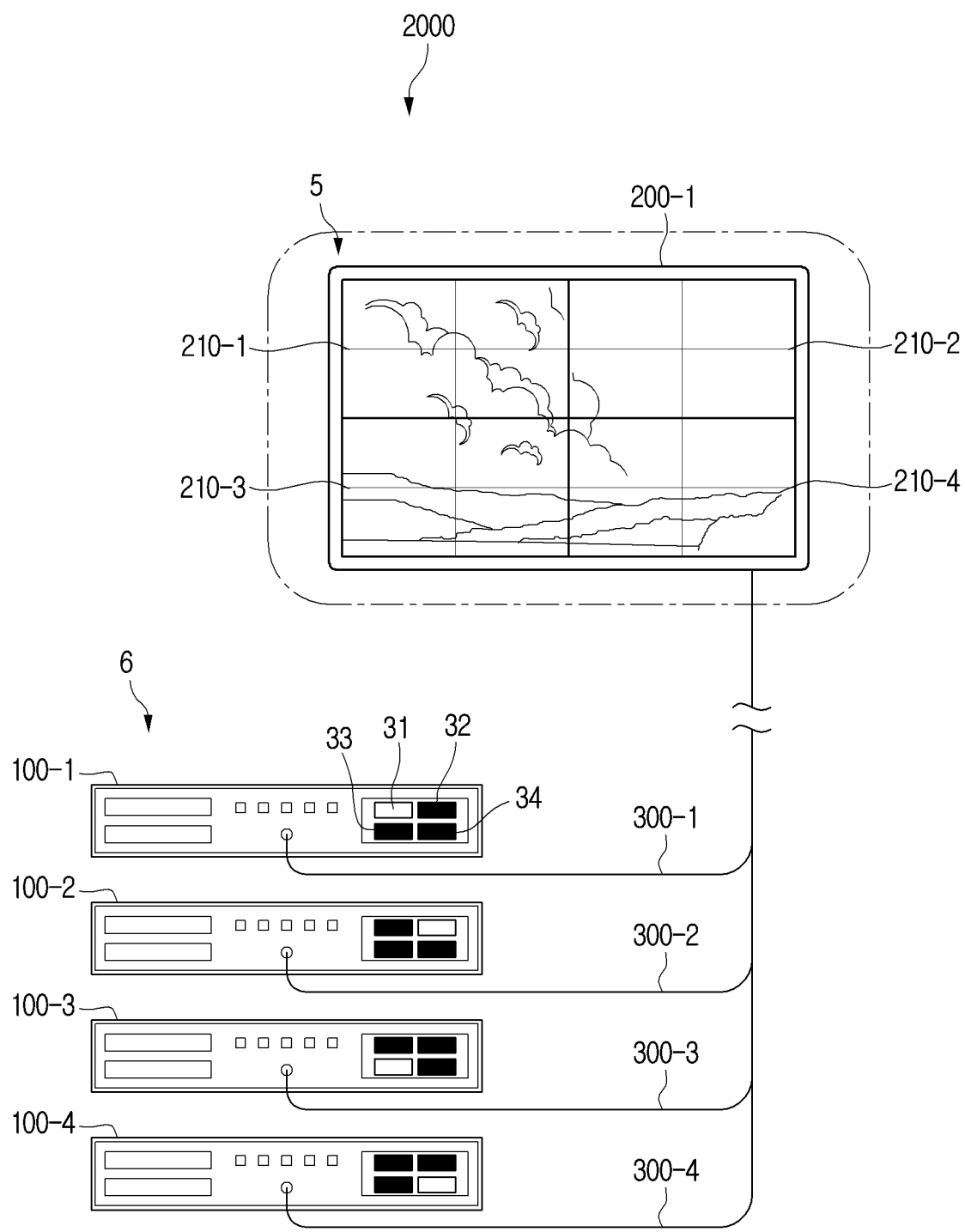
FIG. 11 is a view illustrating outputting location information of an area corresponding to a source apparatus through a plurality of graphic objects according to one or more embodiments of the disclosure.

FIG. 11 is a view illustrating outputting location information of an area corresponding to the source apparatus 100 through a plurality of graphic objects according to one or more embodiments of the disclosure.

In an embodiment, each of a plurality of source apparatuses 100 may further include a display panel. Through this, each source apparatus 100 may display location information of an area corresponding to each source apparatus 100. At this time, a display panel may be implemented with a liquid crystal (LCD) panel, a light emitting diode (LED) panel, a plasma display panel (PDP), an organic emitting diode (OLED) panel, or the like, according to a display method. At this time, the source apparatus 100 may further include an additional configuration according to an implementation type of a display panel. For example, if a display is made of a liquid crystal, a display may include an LCD display panel, a backlight unit providing light, a panel driving substrate driving a panel.

In an embodiment, each source apparatus 100 may display a plurality of graphic objects arranged according to an arrangement format of a plurality of areas through the display panel. In FIG. 11, if four source apparatuses (the first source apparatus 100-1, the second source apparatus 100-2, the third source apparatus 100-3, and the fourth source apparatus 100-4) are connected to the first modular display apparatus 200-1, and each source apparatus (the first source apparatus 100-1, the second source apparatus 100-2, the third source apparatus 100-3, and the fourth source apparatus 100-4) is set to correspond to four areas (four areas each including one cabinet) in the first modular display apparatus 200-1, four source apparatuses (the first source apparatus 100-1, the second source apparatus 100-2, the third source apparatus 100-3, and the fourth source apparatus 100-4) may each display four graphic objects 31 to 34 arranged according to an arrangement format (that is, 2×2 matrix format) of four areas through the display panel.

At this time, each source apparatus 100 may display location information of an area corresponding to the source apparatus 100 by displaying a color of a graphic object arranged at a location corresponding to the area corresponding to each source apparatus 100 among a plurality of graphic objects 31 to 34 to be different from the colors of remaining graphic objects.

That is, In FIG. 11, the processor 130 of the first source apparatus 100-1 may, by displaying a color of a graphic object 31 disposed at an upper left among four graphic objects 31 to 34 to a bright color different from other graphic objects, make a user intuitively identify that the first source apparatus 100-1 transmits image data about an image displayed on an upper left area in the first modular display apparatus 200-1.

Likewise, the processor 130 of each of the second to fourth source apparatuses 100-4 may display location information of an area corresponding to each source apparatus 100, by displaying a color of a graphic object disposed at a location corresponding to a location of an area where an image is displayed to be different from colors of remaining objects based on the image data transmitted by each source apparatus 100.

Figure 12:
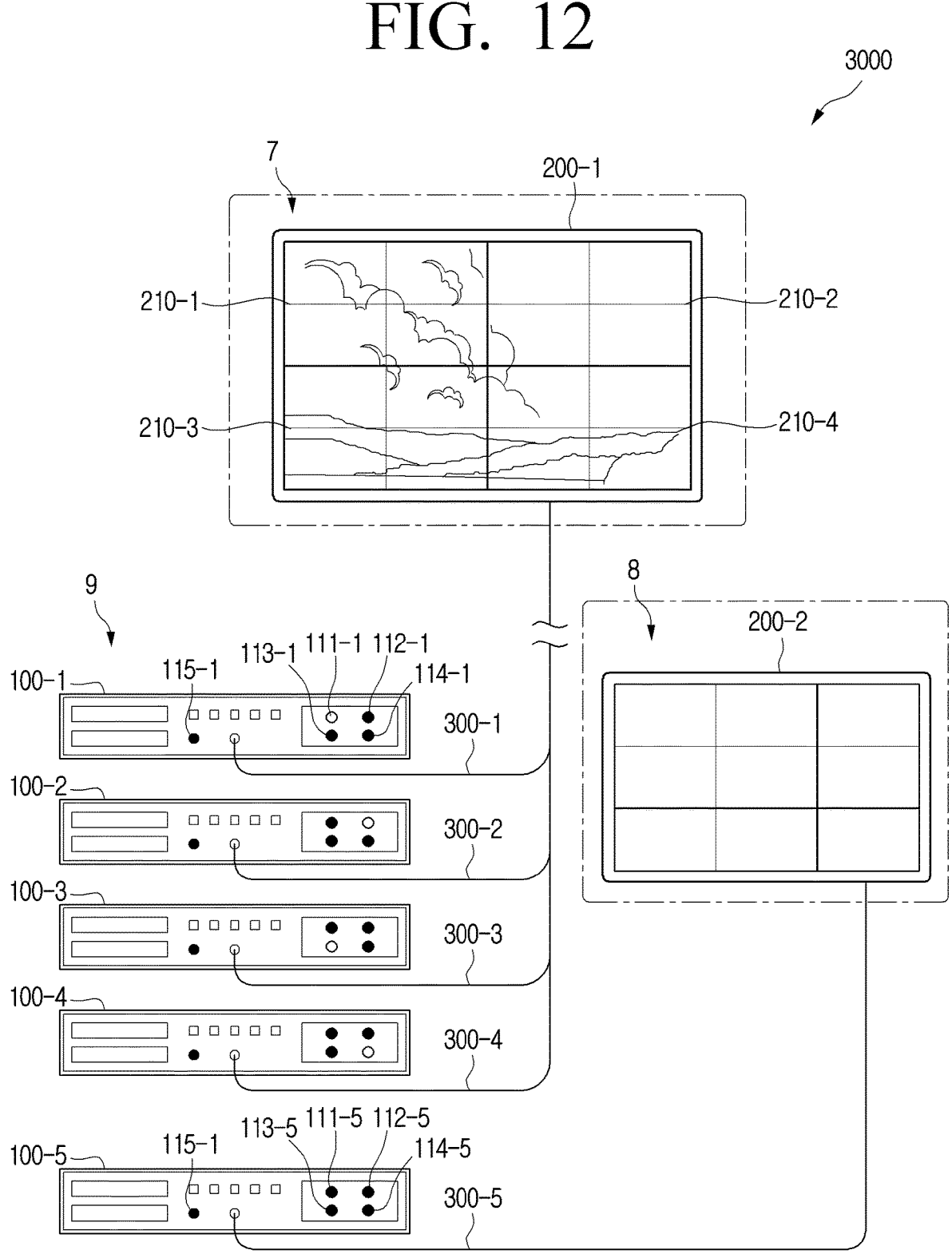
FIG. 12 is a view of a display system according to one or more embodiments of the disclosure.

FIG. 12 is a view of a display system according to one or more embodiments of the disclosure.

Figure 13A:
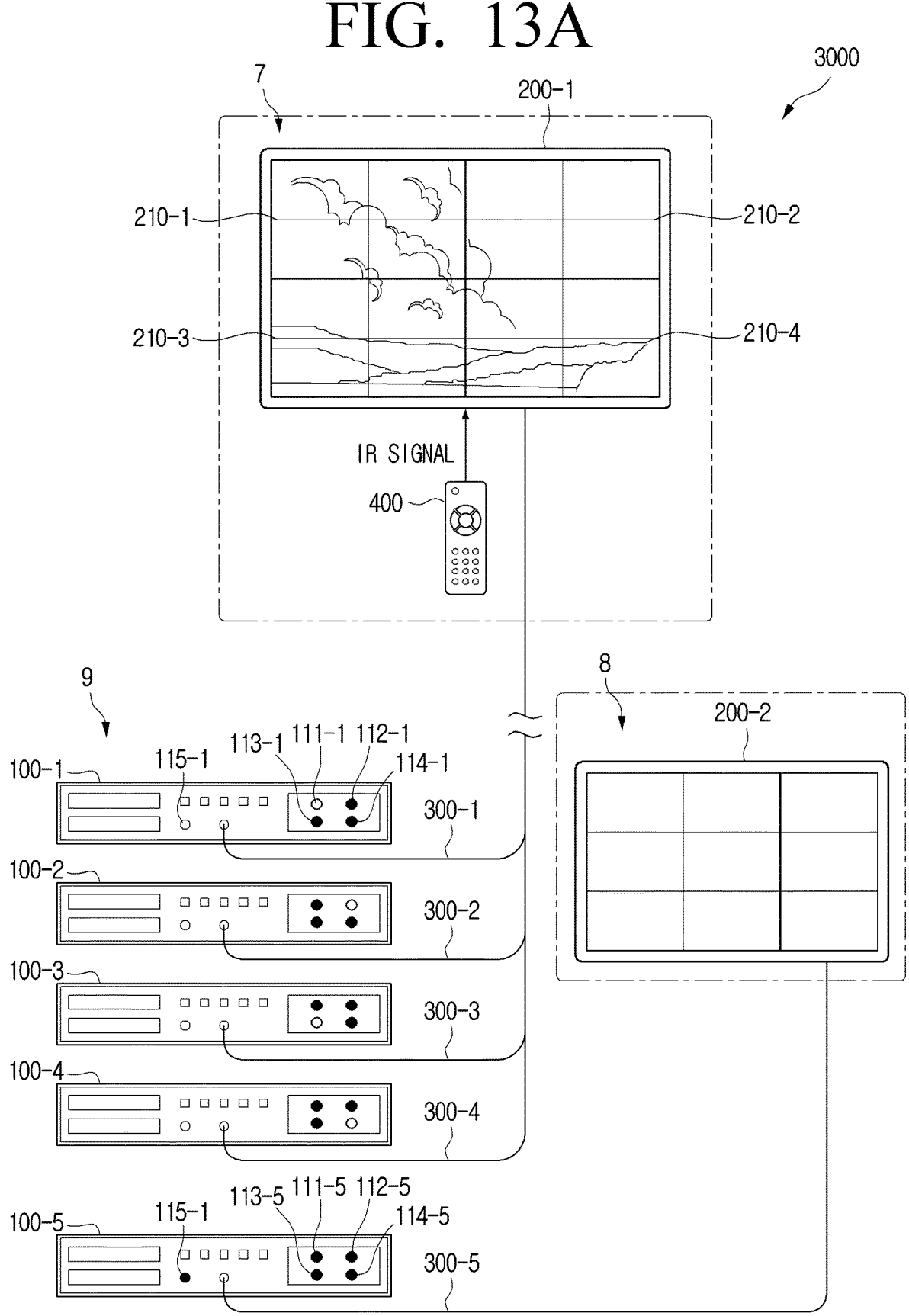
FIGS. 13A and 13B are views illustrating that a source apparatus that has received a notification request signal from a modular display apparatus among a plurality of source apparatuses makes an LED module emit light to output notification information according to one or more embodiments of the disclosure.
Figure 13B:
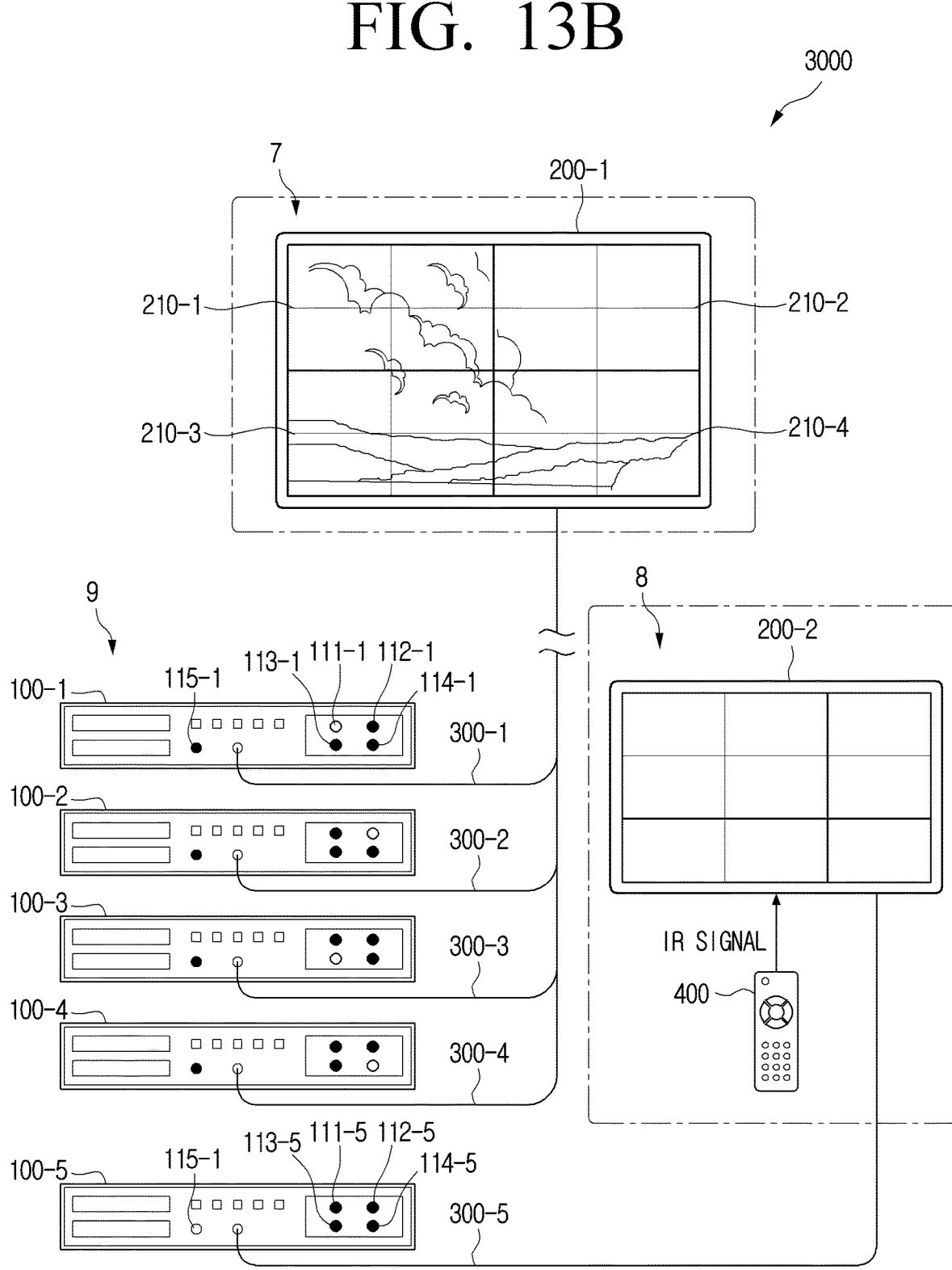

FIGS. 13A and 13B are views illustrating that the source apparatus 100 that has received a notification request signal from the modular display apparatus 200 among a plurality of source apparatuses makes an LED module emit light to output notification information according to one or more embodiments of the disclosure.

According to one or more embodiments of the disclosure, any one modular display apparatus among a plurality of modular display apparatuses 200 in the display system 1000 nay be connected to a plurality of source apparatuses 100, and other remaining modular display apparatuses may be connected to one source apparatus 100. That is, the number and connection state of a plurality of modular display apparatuses 200 connected to the source apparatus may be different from each other.

In one embodiment, as illustrated in FIG. 12, four source apparatuses (the first source apparatus 100-1, the second source apparatus 100-2, the third source apparatus 100-3, and the fourth source apparatus 100-4) may be connected to the first modular display apparatus 200-1 among a plurality of modular display apparatuses 200. In an embodiment, the second modular display apparatus 200-2 may be connected to one source apparatus 100-5. The modular display apparatus 200-1 illustrated in FIG. 12 may correspond to the modular display apparatus illustrated in FIG. 10.

At this time, the processor 130 according to one or more embodiments of the disclosure may, when the source apparatus 100 and another one or more source apparatuses are connected to the common modular display apparatus 200, output information indicating a location of an area at which an image generated based on the image data transmitted by the source apparatus 10 is displayed on the modular display apparatus 200 through the output interface 110, and may, when receiving a notification request signal from the modular display apparatus 200 through the communication interface 120, output the notification information through the output interface 110.

In an embodiment, the processor 130 may identify the connection state between the source apparatus 100 and the modular display apparatus 200. In an embodiment, the processor 130 may identify whether the source apparatus 100 and the another source apparatus other than the source apparatus 100 are commonly connected to the modular display apparatus 200. In an embodiment, when the processor 130 identifies that the source apparatus 100 and the another source apparatus other than the source apparatus 100 are commonly connected to the modular display apparatus 200, the processor 130 may output, in real time, information indicating a location of an area displayed on the modular display apparatus 200 based on image data transmitted by the source apparatus 100 through the output interface 110.

Unlike the foregoing, if it is not identified that the source apparatus other than the source apparatus 100 is commonly connected to the modular display apparatus 200 (that is, when it is identified that the source apparatus is connected to one modular display apparatus 200), the processor 130 may not output information indicating the location of an area displayed on the modular display apparatus 200 based on the image data transmitted by the source apparatus 100.

When the processor 130 of the source apparatus 100 simultaneously receives the notification request signal from the modular display apparatus 200 connected to the source apparatus 100 through the communication interface 120, the processor 130 of the source apparatus 100 may output notification information through the output interface 110.

Accordingly, when the source apparatus 100 and the another source apparatus are commonly connected to the modular display apparatus 200, the output interface 110 of the source apparatus 100 may include an output interface (a first output interface) for outputting information indicating the location of an area in which an image is displayed and an output interface a second output interface for outputting notification information.

In an embodiment, In FIG. 12, when the source apparatus 100 is commonly connected to another source apparatus and the modular display apparatus 200, the first to fourth LED elements 111 to 114 are used to output information indicating the location of an area in which an image is displayed, and the fifth LED element 115 is used to output notification information through the output interface 110 when a notification request signal is received from the modular display apparatus 200.

In FIG. 12, four source apparatuses (the first source apparatus 100-1, the second source apparatus 100-2, the third source apparatus 100-3, and the fourth source apparatus 100-4) connected to the first modular display apparatus 200-1 may output information indicating a location of an area in which an image generated based on image data transmitted by each source apparatus 100 is displayed in real time through the output interface 110. In an embodiment, the processor 130 of each source apparatus 100 may transmit a control signal to a driver in the source apparatus 100 such that a driving current is provided to the LED elements 111 to 114 indicating the location of the area corresponding to each source apparatus 100. Accordingly, each source apparatus 100 may make an LED element arranged at a location corresponding to the location of an area in the modular display apparatus 200 on which an image generated based on the image data transmitted by each source apparatus 100 is displayed emit light.

In an embodiment, in the case of one source apparatus 100-5 connected to the second modular display apparatus 200-2, the first to fourth LED elements 111 to 114 used to output information indicating the location of the area in which the image is displayed do not emit light, thereby indicating that the source apparatus 100-5 is connected to one modular display apparatus (i.e., the second modular display apparatus 200-2).

In FIG. 13A, when a first modular display apparatus 200-1 disposed in a seventh space 7 among a plurality of modular display apparatuses 200 included in the display system 1000 receives a control command for requesting to generate a notification request signal from the control apparatus 400 (the IR communication-based remote controller), the first modular display apparatus 200-1 may generate a notification request signal to be transmitted to a plurality of source apparatuses (the first source apparatus 100-1, the second source apparatus 100-2, the third source apparatus 100-3, and the fourth source apparatus 100-4) connected to the first modular display apparatus 200-1. In an embodiment, the first modular display apparatus 200-1 may transmit the generated notification request signal to a plurality of source apparatuses (the first source apparatus 100-1, the second source apparatus 100-2, the third source apparatus 100-3, and the fourth source apparatus 100-4) connected to the first modular display apparatus 200-1.

The plurality of source apparatuses (the first source apparatus 100-1, the second source apparatus 100-2, the third source apparatus 100-3, and the fourth source apparatus 100-4) receiving the notification request signal from the first modular display apparatus 200-1 may output notification information through the output interface 110. In an embodiment, the four source apparatuses (the first source apparatus 100-1, the second source apparatus 100-2, the third source apparatus 100-3, and the fourth source apparatus 100-4) connected to the first modular display apparatus 200-1 among the plurality of source apparatuses 100-1 to 100-5 disposed in the ninth space 9 to receive the notification request signal from the first modular display apparatus 200-1 may output notification information by making the fifth LED element 115 emit light.

In FIG. 13B, when a second modular display apparatus 200-2 disposed in an eighth space 8 among the plurality of modular display apparatuses 200 included in the display system 1000 receives a control command for requesting to generate a notification request signal from the control apparatus 400 (the IR communication-based remote controller), the second modular display apparatus 200-2 may generate a notification request signal to be transmitted to one fifth source apparatus 100-5 connected to the second modular display apparatus 200-2. In an embodiment, the second modular display apparatus 200-2 may transmit the generated notification request signal to the fifth source apparatus 100-5 connected to the second modular display apparatus 200-2.

In an embodiment, the fifth source apparatus 100-5 receiving the notification request signal from the second modular display apparatus 200-2 may output notification information through the output interface 110. In an embodiment, the fifth source apparatus 100-5 connected to the second modular display apparatus 200-2 among a plurality of source apparatuses 100-1 to 100-5 disposed in the ninth space 9 and receives a notification request signal from the second modular display apparatus 200-2 may output notification information by making the fifth LED element 115-5 emit light.

Figure 14:
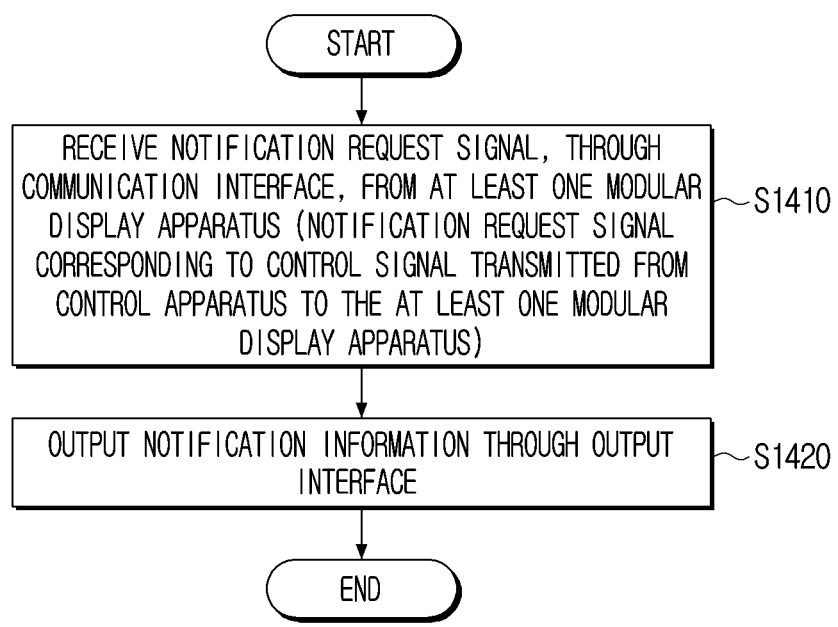
FIG. 14 is a flowchart of a method for controlling a display system according to one or more embodiments of the disclosure.

FIG. 14 is a flowchart of a method for controlling a display system according to one or more embodiments of the disclosure. In an embodiment, the control apparatus 400 transmits a control signal to the first modular display apparatus 200-1 that is connected to the first source apparatus 100-1.

At operation S1410, in order to perform a method of controlling the first source apparatus 100-1, the processor 130 (in the first source apparatus 100-1) may receive a notification request signal, through the communication interface 120 (in the first source apparatus 100-1), from the first modular display apparatus 200-1. The notification request signal corresponds to the control signal (generated from the control apparatus 400 and received by the first modular display apparatus 200-1). In one embodiment, the control signal is based on a user command to identify the first source apparatus 100-1 that is connected to the first modular display apparatus 200-1.

In an embodiment, the processor 130 may output notification information through the output interface 110 in operation S1420.

In an embodiment, the control apparatus may be a remote controller configured to control the modular display apparatus 200, and the control signal may be an IR signal generated by a remote controller.

In an embodiment, the output interface 110 may include an LED element, and at this time, the processor 130 may output notification information by making the LED element emit light.

In an embodiment, the output interface 110 may include a speaker. At this time, the processor 130 may output notification information by outputting sound through a speaker.

In an embodiment, in order to perform a method for controlling any one source apparatus 100 from among a plurality of source apparatuses 100 connected to one modular display apparatus 200 included in the display system 1000, the processor 130 may transmit an image to the modular display apparatus 200 through the communication interface 120. In an embodiment, the processor 130 may output information on the location of an area where the transmitted image is displayed through the output interface 110.

The output interface 110 may include a plurality of light emitting diode (LED) elements arranged according to an arrangement format of the plurality of cabinets. The processor 130 may output information about a location of the area by making an LED element corresponding to the cabinet among the plurality of LED elements emit light.

The output interface 110 may include a display panel. At this time, the processor 130 may display a plurality of graphic objects arranged according to an arrangement format of the plurality of cabinets, display a graphic object corresponding to the cabinet among the plurality of graphic objects in a first color, and display remaining graphic objects in a second color to output information about the location of the area.

In the foregoing description, operations S1410 to S1420 may be further divided into additional steps, or combined into fewer steps, according to one or more embodiments of the disclosure. In an embodiment, some steps may be omitted if necessary, and the order between steps may be changed.

The methods according to one or more embodiments of the disclosure described above may be implemented in the form of an application that may be installed in an existing source apparatus. The methods according to one or more embodiments of the disclosure described above may be performed using a deep learning-based trained neural network (or a deep-learned neural network), that is, a learning network model. In addition, the methods according to one or more embodiments may be implemented by software upgrade of a related art electronic apparatus, or hardware upgrade only. Also, one or more embodiments of the disclosure described above may be performed through an embedded server provided in an electronic apparatus, or through an external server of at least one of an electronic apparatus.

Further, one or more embodiments of the disclosure may be implemented in software, including instructions stored on machine-readable storage media readable by a machine (e.g., a computer). An apparatus may call instructions from the storage medium, and execute the called instruction, including an electronic apparatus according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to one or more embodiments, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to one or more embodiments, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. A display system comprising:
a plurality of source apparatuses; and
a plurality of modular display apparatuses connected to the plurality of source apparatuses,
wherein each of the plurality of source apparatuses comprises:
a plurality of cabinets;
an output interface;
a communication interface connected to the plurality of modular display apparatuses; and
at least one processor configured to:
receive, through the communication interface, a notification request signal from the plurality of modular display apparatuses, and
based on the notification request signal, output notification information through the output interface,
wherein the notification request signal corresponds to a control signal transmitted by a control apparatus to the plurality of modular display apparatuses,
wherein the control signal is based on a user command to identify a source apparatus connected to at least one of the plurality of modular display apparatuses,
wherein the output interface comprises a light emitting diode (LED) element,
wherein the at least one processor is further configured to output the notification information by making the LED element emit light, and
wherein the notification information identifies one source apparatus among the plurality of source apparatuses, which is connected to at least one modular display apparatus among the plurality of modular display apparatuses.

2. The display system of claim 1, wherein the control apparatus is a remote controller configured to control the plurality of modular display apparatuses, and
wherein the control signal is an infrared (IR) signal generated by the remote controller.

3. The display system of claim 1, wherein the output interface comprises a speaker, and
wherein the at least one processor is configured to output the notification information by outputting sound through the speaker.

4. The display system of claim 1, wherein the plurality of cabinets are configured to display a plurality of images provided by the plurality of source apparatuses,
wherein the at least one processor is further configured to:
transmit, through the communication interface, an image to the plurality of modular display apparatuses, and
output, through the output interface, information about a location of an area where the image is displayed.

5. The display system of claim 4, wherein the output interface comprises a plurality of light emitting diode (LED) elements arranged according to an arrangement format of the plurality of cabinets, and
wherein the at least one processor is further configured to output the information about the location of the area by making an LED element, corresponding to one cabinet of the plurality of cabinets, among the plurality of LED elements, emit light.

6. The display system of claim 4, wherein the output interface comprises a display panel, and
wherein the at least one processor is further configured to:
control the display panel to display a plurality of graphic objects arranged according to an arrangement format of the plurality of cabinets,
display a graphic object corresponding to one cabinet of the plurality of cabinets, among the plurality of graphic objects, in a first color, and display remaining graphic objects, among the plurality of graphic objects, in a second color, and
output the information about the location of the area.

7. A method of controlling a plurality of source apparatuses in a display system, the method comprising:
receiving a notification request signal, through a communication interface, from one of a plurality of modular display apparatuses; and
based on the received notification request signal, outputting notification information through an output interface,
wherein the notification request signal corresponds to a control signal transmitted by a control apparatus to the plurality of modular display apparatuses,
wherein the control signal is based on a user command to identify one of the plurality of source apparatuses, which is connected to at least one of the plurality of modular display apparatuses,
wherein the output interface comprises a light emitting diode (LED) element,
wherein the outputting comprises outputting the notification information by making the LED element emit light, and
wherein the notification information identifies one source apparatus among the plurality of source apparatuses, which is connected to at least one modular display apparatus among the plurality of modular display apparatuses.

8. The method of claim 7, wherein the control apparatus is a remote controller configured to control the plurality of modular display apparatuses, and
wherein the control signal is an infrared (IR) signal generated by the remote controller.

9. The method of claim 7, wherein the output interface comprises a speaker, and
wherein the outputting comprises outputting the notification information by outputting sound through the speaker.

10. A method of controlling a plurality of source apparatuses connected to a plurality of modular display apparatuses in a display system, the method comprising:
transmitting, from one of the plurality of source apparatuses, an image to the plurality of modular display apparatuses; and
outputting, through an output interface of the one of the plurality of source apparatuses, information about a location of an area where the transmitted image is displayed,
wherein the method further comprises:
receiving, by the one of the plurality of source apparatuses, a notification request signal from the plurality of modular display apparatuses,
based on the notification request signal, outputting notification information through the output interface,
wherein the notification request signal corresponds to a control signal transmitted to the plurality of modular display apparatuses,
wherein the control signal is based on a user command to identify the one of the plurality of source apparatuses, which is connected to at least one of the plurality of modular display apparatuses,
wherein the output interface comprises a light emitting diode (LED) element,
wherein the outputting the notification information comprises outputting the notification information by making the LED element emit light, and
wherein the notification information identifies one source apparatus among the plurality of source apparatuses, which is connected to at least one modular display apparatus among the plurality of modular display apparatuses.

11. The method of claim 10, wherein the output interface comprises a plurality of light emitting diode (LED) elements arranged according to an arrangement format of a plurality of cabinets, and
wherein the outputting comprises outputting the information about the location of the area by making an LED element corresponding to one cabinet of the plurality of cabinets, among the plurality of LED elements, emit light.

* * * * *